(No Model.)
A. J. MARTIN.
GRAIN DRILL.
No. 376,538. Patented Jan. 17, 1888.
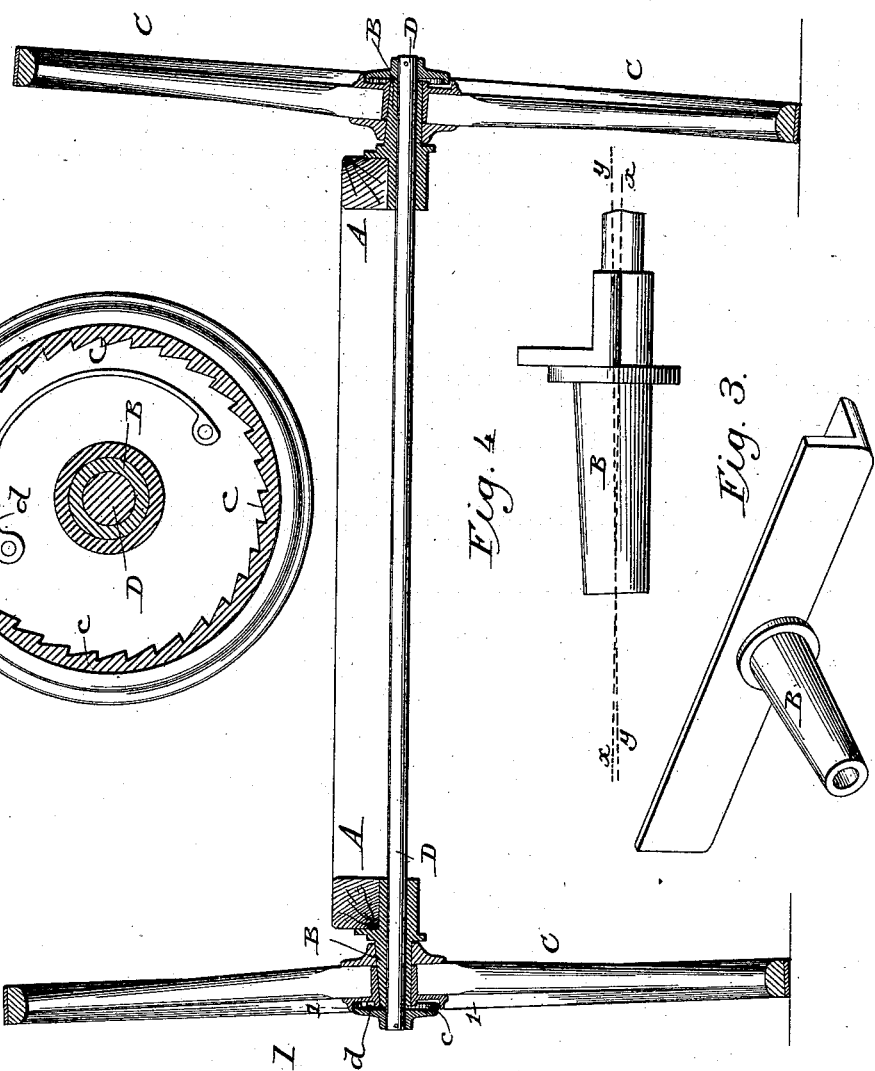

UNITED STATES PATENT OFFICE.

ANDREW J. MARTIN, OF MACEDON, NEW YORK, ASSIGNOR TO HELEN M. KIRKPATRICK, OF SAME PLACE.

GRAIN-DRILL.

SPECIFICATION forming part of Letters Patent No. 376,538, dated January 17, 1888.

Application filed June 1, 1887. Serial No. 239,980. (No model.)

*To all whom it may concern:*

Be it known that I, ANDREW J. MARTIN, of Macedon, in the county of Wayne and State of New York, have invented certain Improvements in Grain-Drills, of which the following is a specification.

Grain-drills and other agricultural machines are commonly constructed with a main frame and two carrying-wheels mounted on opposite ends of a revolving shaft or axle, which extends through the machine from side to side and imparts motion through intermediate gearing to the distributing mechanism. The carrying-wheels are commonly made, like those of carriages and wagons, of a dished or concave form, their spokes having a slight lateral inclination with respect to the axis of revolution. In the use of these dished wheels it is desirable to incline them outward slightly from the perpendicular at the top, in order to bring the spokes which are for the time being under the axle in a substantially vertical position. In grain drills as heretofore constructed this was inadmissible, for the reason that the wheels are mounted directly upon the ends of the rotating shaft or axle or on an axis coinciding therewith.

My invention consists, essentially, in mounting the wheels on tubular journals inclined slightly from the horizontal, and in extending the shaft through these journals and connecting it at the outer ends with the wheel or wheels by suitable clutching or driving devices, so that, although the axes of the shaft and the wheels diverge, the wheels communicate motion to the shaft.

Referring to the drawings, Figure 1 represents a transverse vertical section through the frame, wheels, and shaft of a seeding-machine having my invention embodied therein. Fig. 2 is a vertical section on the line 1 1. Fig. 3 is a perspective view of one of the tubular journals or spindles in its preferred form. Fig. 4 is a side elevation of the same.

In the accompanying drawings, A represents the main frame, of ordinary construction; and B B, the tubular journals or spindles, bolted or otherwise rigidly fixed to the sides of the frame, and adapted externally to receive the ground-wheels C, which are mounted and arranged to revolve freely thereon. The wheels, as shown, are of the ordinary dished form, and the tubular journals are constructed and applied in such manner that the axis of rotation of each wheel has a slight downward inclination from the frame outward, the effect being to throw the upper sides of the wheels outward, as commonly practiced in carriages and wagons.

D represents the main shaft or axle extending across the machine from side to side, and projected at its ends through and beyond the tubular journals, by which it is preferably supported, although it may have, if desired, additional supports or bearings on the frame.

It will be observed that the axis of the shaft thus applied is out of line with the axes of the tubular journals, as plainly indicated in Fig. 4, in which $x$ $x$ indicate the axis of the shaft, and $y$ $y$ the axis of one of the wheels. Each end of the shaft has secured on it a disk having a peripheral internally-toothed flange, $c$, adapted to engage dogs or pawls $d$, pivoted to the hub of the ground-wheel. These devices serve to communicate a forward rotation from the wheel to the shaft, and allow either wheel to turn backward independently of the shaft.

The clutching or coupling devices herein shown may be replaced by others of any known or approved form, many equivalent arrangements being familiar to every skilled mechanic.

Having thus described my invention, what I claim is—

1. In a seeding or similar machine, the combination of a main frame, concave or dished supporting-wheels, tubular journals fixed to the frame and carrying said wheels, the axes of said journals being inclined from the horizontal, a shaft extending across the frame and projected at its ends through the journals, and clutch devices connecting said shaft at the outer ends with the wheels.

2. In a seeder or similar machine, the combination of the main frame, the tubular axles flanged at their inner ends and bolted to said frame, and the transverse shaft projected at its ends through said journals and connected by clutch devices to either or both of said wheels, the axes of the shaft and of the journals lying in divergent lines, substantially as described.

In testimony whereof I hereunto set my hand, this 9th day of February, 1887, in the presence of two attesting witnesses.

ANDREW J. MARTIN.

Witnesses:
MARTIN DEAN,
JOHN H. BOSWORTH.